(12) United States Patent
Khedkar et al.

(10) Patent No.: US 10,586,391 B2
(45) Date of Patent: Mar. 10, 2020

(54) INTERACTIVE VIRTUAL REALITY PLATFORMS

(71) Applicant: ACCENTURE GLOBAL SOLUTIONS LIMITED, Dublin (IE)

(72) Inventors: Nikhil Chandrakant Khedkar, Thane (IN); Sanyog Suresh Barve, Mumbai (IN); Sandip Chhaganlal Sutariya, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 108 days.

(21) Appl. No.: 15/608,827

(22) Filed: May 30, 2017

(65) Prior Publication Data

US 2017/0345215 A1  Nov. 30, 2017

(30) Foreign Application Priority Data

May 31, 2016  (IN) .............................. 201641018602

(51) Int. Cl.
| | |
|---|---|
| *G06T 19/00* | (2011.01) |
| *G06F 16/907* | (2019.01) |
| *G06F 3/01* | (2006.01) |
| *G06F 3/0484* | (2013.01) |
| *G06F 3/038* | (2013.01) |
| *G06K 9/00* | (2006.01) |
| *G06F 16/9537* | (2019.01) |
| *G06F 3/0482* | (2013.01) |
| *G06F 3/0487* | (2013.01) |

(Continued)

(52) U.S. Cl.
CPC ............ *G06T 19/006* (2013.01); *G06F 3/011* (2013.01); *G06F 3/012* (2013.01); *G06F 3/038* (2013.01); *G06F 3/0482* (2013.01); *G06F 3/0487* (2013.01); *G06F 3/04842* (2013.01); *G06F 3/167* (2013.01); *G06F 16/907* (2019.01); *G06F 16/9537* (2019.01); *G06K 9/00* (2013.01); *G06K 9/00335* (2013.01); *G06K 9/00604* (2013.01); *G06K 9/00671* (2013.01); *G06Q 30/0633* (2013.01); *G06T 19/003* (2013.01); *G06Q 30/0601* (2013.01)

(58) Field of Classification Search
CPC ..... G06T 19/006; G06T 19/20; H04N 13/332; H04N 13/366
USPC ....................................................... 345/419
See application file for complete search history.

(56) References Cited

U.S. PATENT DOCUMENTS

| | | |
|---|---|---|
| 8,737,691 B2 | 5/2014 | Sivaraman et al. |
| 2011/0216090 A1* | 9/2011 | Woo .......... G06K 9/00 345/633 |
| 2012/0050257 A1 | 3/2012 | Clarke |

(Continued)

*Primary Examiner* — Yi Wang
(74) *Attorney, Agent, or Firm* — Mannava & Kang, P.C.

(57) ABSTRACT

A framework for interactive VR content items provides for user interaction via placement of interaction points within VR content items that would otherwise be passively viewed by users on HMD devices. The interaction points are defined by positional metadata that contains information regarding when and where the interaction points should be displayed during the interactive VR content play. The interaction points are also defined by action metadata that determines one or more actions to be executed when the user selects the interactions points. Selection of the interaction points via one or more of a user gesture and a voice input is also enabled by the framework.

19 Claims, 10 Drawing Sheets

(51) Int. Cl.
*G06F 3/16* (2006.01)
*G06Q 30/06* (2012.01)

(56) References Cited

U.S. PATENT DOCUMENTS

| | | | |
|---|---|---|---|
| 2012/0185886 A1* | 7/2012 | Charania | H04N 21/4312 |
| | | | 725/2 |
| 2014/0152558 A1* | 6/2014 | Salter | G06F 3/013 |
| | | | 345/157 |
| 2014/0184589 A1* | 7/2014 | Vesely | G06F 3/012 |
| | | | 345/419 |
| 2014/0226000 A1* | 8/2014 | Vilcovsky | G06F 3/017 |
| | | | 348/77 |
| 2014/0280505 A1 | 9/2014 | Cronin | |
| 2015/0206348 A1* | 7/2015 | Koreeda | H04N 21/4725 |
| | | | 345/633 |
| 2015/0212322 A1 | 7/2015 | Moravetz | |
| 2016/0350609 A1* | 12/2016 | Mason | G06K 9/00892 |
| 2017/0076560 A1* | 3/2017 | Dasilva | G06Q 10/06 |
| 2017/0109936 A1* | 4/2017 | Powderly | G06F 3/012 |

\* cited by examiner

INTERACTIVE VIRTUAL REALITY PLATFORMS

CROSS REFERENCE TO RELATED APPLICATIONS

The present application claims priority under 35 U.S.C. 119(a)-(d) to Indian application number 201641018602, having a filing date of May 31, 2016, the disclosure of which is hereby incorporated by reference in its entirety.

BACKGROUND

Virtual reality (VR) is a computer generated environment which a human being may experience via VR devices such as Head-Mounted Displays (HMDs) that are currently available. VR exploits the various aspects of sight of a human such as the depth perception in addition to a person's sense of balance. Manufacturers of various VR devices and related software aim at closely synchronizing the hardware and the software of their VR devices with a person's perception so that the person gets immersed in the VR environment being displayed. The development of HMDs that enable VR experiences for users has led to the creation of immersive VR experiences such as video games, documentaries, educational packages, training tools and the like.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
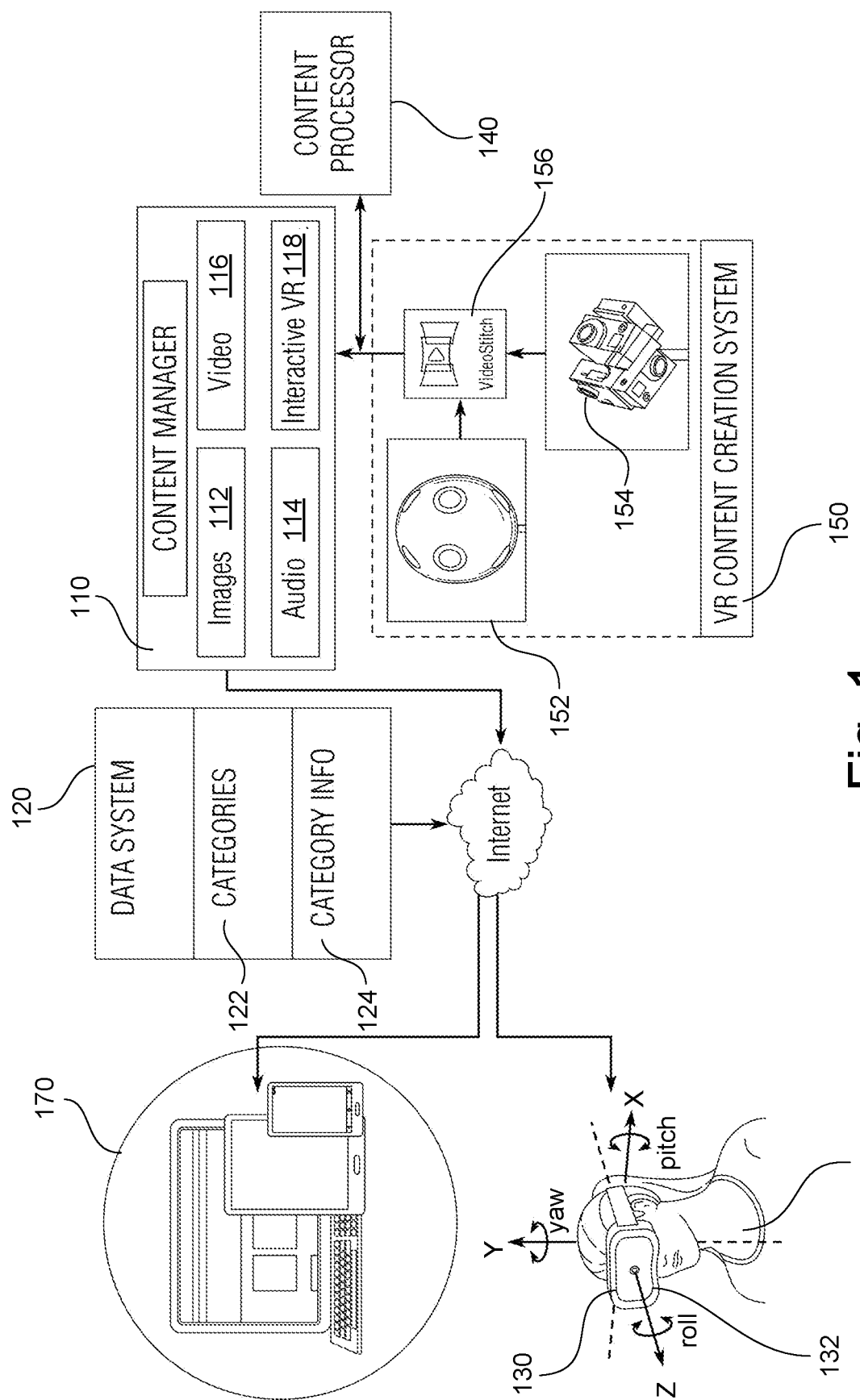
FIG. 1 shows a diagram of an interactive VR content providing platform in accordance with an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to examples described herein, a framework for generating interactive VR content is disclosed. Generally, VR content includes computer generated simulation of a three-dimensional image or environment that is viewed with special user devices such as the HMDs mentioned above which exploit a viewer's vision properties such as depth perception or sense of balance to provide experiences that give the viewers a feeling of actually being present in the environment. Various types of VR content such as games, movies, documentaries, educational or training materials etc. that are currently popular may not require specific commands from the users other than the user's head movements to move the VR display as the user navigates through a VR environment. The framework disclosed herein allows users to not only view VR content but also enables them to provide input for manipulating and interacting with the VR content in different ways. The user input may be received in different forms which may include one or more of user gestures and voice commands and the VR images can be configured to respond to the user input.

An interactive VR content system disclosed herein includes a VR content creation system wherein VR content of various types is created. VR content obtained from cameras that simultaneously capture a 360 degree view of a real-world or virtual world scenery is fed to a VR content processor. The VR content processor identifies points or locations within a given VR content item that are interaction points based on the type of VR content item. The interaction points enable the user to interact with the VR content. The VR images/video shot by 360 degree cameras are configured with particular User Interface (UI) elements and can be shown on a VR display at the interaction points so that the UI elements may be selected by the user via the user input to execute specific actions. The identified interaction points are defined by position metadata and action metadata.

The positional metadata of an interaction point defines a position of the interaction point or when and where the interaction point is to be displayed within the interactive VR content item. For VR content items such as those generated for travel, shopping or entertainment such as games, the locations for receiving interaction points can include locations which are likely to be of interest to the user within the VR content item. In the case of VR content items such as those generated for education or training, the interaction points may be located at positions that do not obscure a student's view of the training or educational content. The action metadata defines an action that is to be executed when the interaction point is selected by a user. The actions executed in response to the user selection may depend upon the type of VR content being viewed. In many VR content types, interaction points that provide further details about specific image or a portion of an image may be added to the VR content items. In one example, the interaction points within VR content items associated with an ecommerce application may include UI elements which not only provide the users with an immersive shopping experience but also enable the users to select and purchase products without having to exit the interactive VR environment. In a VR content item associated with an educational package, interaction points may include user elements that allow users or students to initiate chats or exchange messages with instructors who may be available online. In an interactive VR game, user elements that allow actions customized to the game may be included at specific identified interaction points. It can be appreciated that only some actions that can be executed in response to selection of interaction points are described herein for brevity and that other actions can also be enabled via user selection of the interaction points.

Interactive VR content including interactive VR content items may be uploaded to a content management system (CMS) which distributes the interactive VR content to users via one or more of a website or a software application ("app") which can be executed on a mobile device. In an example, the CMS hosts VR content along with other web-based content. The website or app may include a user interface element or a widget or may be responsive to a voice command during a VR content item display in order to provide access to an interactive version of the VR content item. When a user device initially accesses the website or opens the app, a VR content item without the interaction points may be displayed. Upon activation of the widget or receiving a voice command, the display may be switched to show the interactive VR content item. Various actions are executed based on the activation of the UI elements of the interactive VR content item.

The VR content generation and distribution systems disclosed herein provides technical benefits including improving realism and taking advantage of enhanced hardware capabilities enabled by the VR devices. The system and method disclosed herein further provide a technical solution to technical problems related, for example, to control of operations on virtual objects or images based on specific VR content types. Ancillary input devices including joy sticks or gloves may also be employed by the users to provide user input or otherwise interact with the VR content item. However, problems such as unreliable wireless connections between the HMD and the input devices tend to disturb the users from being immersed in the VR experience. The disclosed subject matter enables providing user input via one or more of the user's head movements or via detecting the user's voice commands so that specific UI elements can be selected for executing particular actions. As the tracking of head movements or detection of the user's voice commands does not rely on wireless connections, the user remains undisturbed and immersed in the interactive VR experience.

The interactive VR platform further provides distinct advantages when implemented within an ecommerce environment. Ecommerce websites/mobile apps normally provide static images and/or videos of the products in order to sell them to the customers. However, the static images and videos are two-dimensional and may not provide an accurate perspective of the products being sold. For example, two-dimensional images of furnishings may not provide an accurate view of how they would appear when used with a piece of furniture as the depth perception is absent in two-dimensional content. Similar problems may exist when shopping for clothes. The interactive VR platforms disclosed herein enable users to experience the things they intend to buy more closely and as a result interactive VR content providing systems such as those described herein may increase customer satisfaction while reducing the number of returned items. Implementing VR platforms for ecommerce websites/mobile apps may also increase the stickiness so that users spend more time browsing the retailers online store which in turn increases the probability of converting a browsing session into a buying session.

FIG. 1 shows a diagram of an interactive VR platform 100 in accordance with an example. The interactive VR platform 100 includes a VR content creation system 150 that creates VR content items. An interactive VR content processor 140 processes the VR content items from the VR content creation system 150 to add interactive elements to the VR content items. The interactive elements with the VR content items are stored as the final, interactive VR content items 118 by the content manager 110. The interactive VR content items 118 are transmitted by the content manager 110 for display on user devices such as HMD 130. The user 160 manipulates the VR content shown on a display 132 of the HMD 130, for example, by moving her head in order to manipulate and interact with the interactive VR content items 118 that the user 160 may be viewing. Different content providing devices that are available ranging from expensive equipment such as OCCULUS RIFT, HTC VIVE to the much cheaper Google cardboard may be employed to access and interact with the interactive VR content items 118 in accordance with examples described herein.

A data system 120 provides additional data required for generating the interactive VR content. The content processor 140 processes the VR content generated by the VR content creation system 150 with the data from the data systems 120 to generate the interactive VR content items 118. The content manager 110 is configured to host various types of content which may include without limitation, static images 112, audio 114, video 116 which may be provided to various end user devices 170 via different interfaces such as web interfaces, apps and the like. The content manager 110 can be further configured to host interactive VR content items 118 that are created by the VR content creation system 150 and processed by the content processor 140. In an example, the content manager 110 may have a framework including a separate content category and related procedures defined for handling the interactive VR content items 118. Moreover, the content manager 110 may be able to switch from static images 112 or audio 114 to the interactive VR mode to provide the interactive VR content items 118 during a user session when transmitting content to the HMD 130.

The VR content creation system 150 may employ special cameras (360 degree cams) 152 and/or 154 to capture 360 degree images of a real-world location or a real-world object which are stretched and stitched together with video processing tools 156 to generate a single image/video. For example, a 360 degree camera such as a BUBLCAM or camera stands which accommodate multiple smaller cameras in spherical configurations such as the 360 degree cameras 154 may be used to capture 360 degree panoramic shots of real-world environments. The single image when viewed through the HMD 130 may resemble what a viewer would see when actually present in the real-world environment. In another example, various computer generated imagery may also be used for generating VR content of virtual environments which may also be used to create interactive VR content items 118. The VR content thus created may be uploaded to the content manager 110. In an example, VR content that is generated outside of the VR content creation system 150 may be fed directly to the content manager 110 for the generation of the interactive VR content items 118.

In an example, the content manager 110 may include or may be communicatively coupled to the data system 120 that may provide additional content needed to generate the interactive VR content items 118. The data system 120 stores content categories 122 and related category info 124 based on which the interactive VR content items 118 may be generated. The content categories 122 may include but are not limited to entertainment, ecommerce, education and training, travel, leisure and the like. Each content category has a respective category info 124 defined within the data system 120. For example, an ecommerce content category may have category info 124 which may generally include product information such as those stored in database tables such as, data/metadata of products which are imaged by the VR content creation system 150, product names, product codes, product attributes, description, product categories, prices, deals or discounts, current availability, related products and the like. A content category 122 such as entertainment may again be divided into subcategories such as movies, games, TV shows, books and the like and the category info 124 may be specific to the content subcategory. For example, content info for a movie or book may include information about the cast and/or characters, release date, current availability or accessibility and the like. The category info 124 for games may be customized to a particular game depending on the info that the makers of the game would like to make available to the players. For education and training content category, the category info 124 may include information regarding the contents of the education material or training course, whether the content is instructor-based or for self-study, the person/organization making the material/course available, the price, how to access the course and the like. VR content items under travel category may have information on the location, places of interest, modes of transportation and other geographic and demographic details as category info 124.

In an example, the content processor 140 can employ the category 122 of the VR content item to identify specific points or locations within the VR content item wherein the interaction points can be located. The category of the VR content item can be obtained via manual classification or may be automatically realized from tags etc. associated with the VR content item. In an example, locations for placement a core set of interaction points within the VR content items can be standardized or predetermined. For example, position of interaction points such as those for accessing a shopping cart in an ecommerce content category or for accessing playback controls in an entertainment content category may be standardized throughout such that any VR content item categorized thereunder can have its core set of interaction points placed at the predetermined locations. Accordingly, the position and action metadata for such core set of interaction points are included by default upon categorizing the VR content item under that particular content category.

For example, if a particular VR content item is categorized as ecommerce content, the interaction points may be placed on items for sale which are imaged in the VR content item so that the user may select the specific item for viewing it in greater detail, obtaining more information or for completing a purchase transaction. Similarly if the particular VR content item is categorized under education/training category, the interaction points may be positioned such that they do not obscure users from viewing important details of the training material.

The category info 124 can be employed to identify the actions that will be executed when the interaction points are selected by the user when interacting with one of the interactive VR content items 118. In an example, the category 122 data and the category info 124 may be provided to the content processor 140 via configuration files stored for example, on the data system 120. Reverting to the ecommerce example, selection of an interaction point may display product details, price and the like. In the educational material example, selection of the interaction point may enable the user 160 to initiate a verbal conversation with an online trainer. The interactive VR content items 118 may thus include information regarding the interaction points within the VR content obtained from the VR content creation system 150 along with the metadata associated with the content, and instructions related to the actions corresponding to the interaction points.

The interactive VR content items 118 are displayed to the user 160 via an application or other widget executed by the HMD 130. In an example, VR content obtained directly from the VR content creation system 150 may be shown to the user 160 in an application which includes a widget or user interface element that provides access to the interactive version of the currently viewed VR content item. The display mode is therefore switched from passive viewing mode to an interactive mode wherein the interaction points within the VR content item are shown to the user via display of respective user interface elements.

The interactive VR content items 118 may indicate the interaction points there within via user interface elements such as but not limited to, icons, gleams, links, or other visible symbols which will invite further exploration from users of the interactive VR content items 118. In an example, the interaction points need not be identified by any separate user interface elements. Rather, specific images within the VR content item themselves may have one or more of position and action metadata associated therewith in order to allow user interactions with such specific images. Such aspects may generally be useful in certain content categories such as games, wherein users manipulate images during game play. When the user 160 provides user input via interacting with selected icons, the content and other interactions associated with the icons and the user input are retrieved and executed by widget. The user 160 may provide the user input via one or more of gestures such as the movement of her head, neck or via voice commands. The user's 160 head movements may be detected via readings from directional components or sensors included in the HMD 130 which may include one or more of an accelerometer, a gyroscope, depth sensors, image sensors, a compass and the like. In addition, inward-facing image sensors which enable gaze tracking can also be mounted on the HMD 130. For example, the direction of the user's 130 gaze can be determined by capturing images of the user's 160 eyeballs and detecting glints appearing in the user's 160 eyes or by detecting the location of the pupil's within the user's 130 eyes.

The voice commands may be detected via a microphone included in the HMD 130. The interactive VR content items 118 may include instructions that execute particular actions for specific readings from the sensors of the HMD 130. Referring again to the ecommerce example, the interactive VR content items 118 may display products for sale such as furniture and the interaction points allow the user 160 to select specific products, browse product information and make a purchase without exiting the immersive VR environment.

Figure 2:
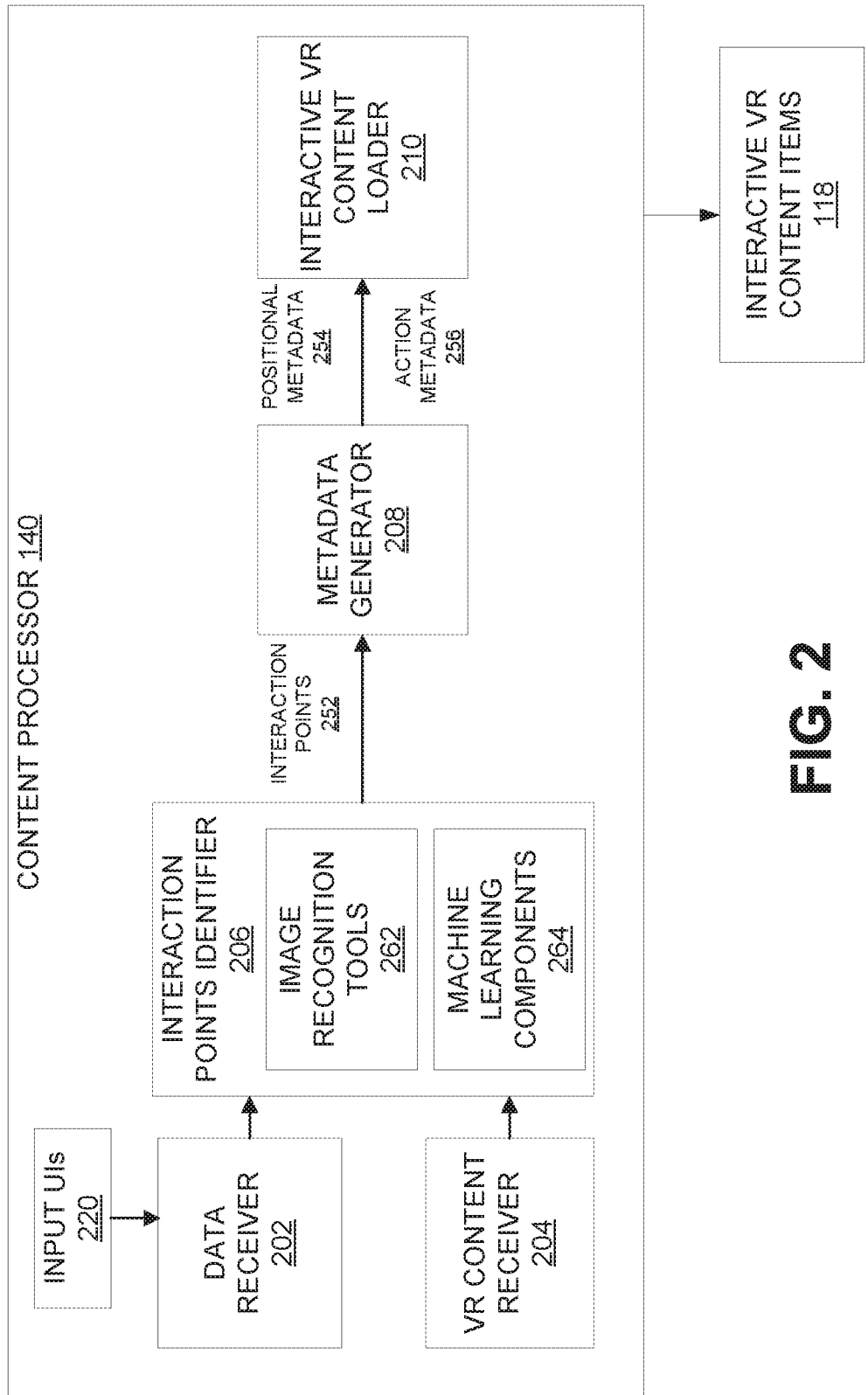
FIG. 2 is a block diagram that shows details of a content processor in accordance with an example.

FIG. 2 is a block diagram that shows the details of the content processor 140 in accordance with an example. The content processor 140 includes a data receiver 202 and a VR content receiver 204 for receiving inputs that are required to generate the interactive VR content items 118. The VR content receiver 204 is configured to receive the VR content generated by the VR content creation system 150. In an example, a computing machine that executes the video stitching procedure to generate the complete VR images may be communicatively coupled to the content processor 140 to transmit the complete VR content. In an example, the computing device executing the video stitching procedure may also carry out the functions described herein for the content processor 140. In an example, the content processor 140 may also receive VR content from sources outside of the VR content creation system 150. For example, a VR content item that was previously generated may be processed by the content processor 140 in order to add the interactive aspects as disclosed herein to generate an interactive version of the VR content item.

The data receiver 202 can access the category 122 data in order to categorize the VR content into one or more of entertainment, ecommerce, educational and the like. In an example, one or more of the category 122/sub-category data and the category info 124 can be provided to the data receiver 202 via, for example, input user interfaces 220 or via inputs from configuration files which may be included in the data system 120. A programmer may either enter the category 122 or sub-category data/category info 124 manually through the input user interfaces 220 or may load the configuration files to the data system 120 to provide the necessary inputs. Of course, each content category may have sub-categories, such as, entertainment category may have sub-categories like movies, games and the like, ecommerce may have sub-categories like garments, furniture, electronics and the like while educational category may have subject-wise sub-categories. Similarly, a VR content item can be categorized under more than one category. For example, an infotainment VR content item can be categorized under education and entertainment, or a VR content item related to an online training course can be classified as education and ecommerce. Another example can be online movie, game or music providers who may be classified under entertainment and ecommerce. Many such examples can be provided wherein a VR content item is classified under multiple content categories.

The category info 124 obtained by the data receiver 202 provides for one or more of the information and actions to be executed via the interaction points that will be coupled to the VR content item. In case a VR content item is classified under multiple content categories, the category info 124 from all the content categories may be employed in identifying the actions for interaction points that are to be coupled to the VR content item. The interaction point identifier 206 employs the category 122 data to identify positions for the interaction points 252 within a given VR content item. As discussed herein, based on whether the VR content item pertains to an entertainment, educational or ecommerce category, the interaction points may be located at specific positions within the VR content item. In an example, the interaction points may be selected manually by a content processing user who views the VR content item, for example, on a computing device and positions the interaction points via a mouse click operation or drag-and-drop operation and the like depending on the application tools employed for generating the interactive VR content item. Templates or guidelines may be used as aids in guiding the content processing user during the placement of the interaction points.

In an example, image recognition tools 262 and machine learning components 264 may be used to identify images in the VR content item and the interaction points may be placed automatically using Artificial Intelligence (AI) techniques that aid machine learning components 264 to place the interaction points based on the input from the image recognition tools 262. In an example, a mixed approach may be employed wherein default interaction points are automatically placed and a content processing user initially processes a particular VR content item to generate an interactive VR content item. The VR content items thus processed by a human user can be used as learning data by the machine learning components 264 to subsequently process similar VR content items. In addition, a set of interactive VR content items that are entirely produced by the content processing user can be used to teach the machine learning components 264 to generate similar interactive VR content items automatically.

In addition to the position of the interaction points, the interaction point identifier 206 also identifies an action that is to be executed when the user elects to interact with the interactive VR content item via the interaction point. Based on the associated actions, various types of interaction points may be defined such as but not limited to, informational interaction points, view-transformation interaction points, payment-processing interaction points, action-based interaction points and the like. Informational interaction points are those which display additional information regarding an underlying image such as those which display description, price or other details regarding a sale item in an ecommerce application. Upon the selection of an informational interaction point, the additional information may be displayed on a transparent overlay that is closed automatically as the user navigates away from the informational interaction point. View-transformation interaction points change the display being viewed by the user 160 in some manner such as completely altering the display to show other images, zooming-in or zooming-out, displaying an object in various angles which is a unique ability of VR content and the like. Payment processing interaction points can be those which enable adding items to a virtual shopping cart, checking out the items and selecting payment modes to pay for the items and the like. Action-based interaction points enable various actions to be executed such as customized actions that are required in VR games or play, pause, fast-forward, rewind or other actions that can be executed with VR content categorized under entertainment category.

The various types of interaction points to be included in the interactive VR content item being processed may depend on the category info 124. For example, if the VR content item is classified as an ecommerce item, the category info 124 may include a product description, a price, modes of payment and the like. Based on the category info 124, one or more informational interaction points may be included to convey the product description and price, and payment processing interaction points may be included in order to allow the user to purchase the items. Action-based interaction points may be optionally included, based for example on the product description, to allow the user to zoom-in to examine a finish or material of the sale item or to view the sale item from different angles and the like. Similarly other types of interaction points may be included in interactive VR content items associated with other categories based on the respective category info 124. Specific user interface (UI) elements may be used to identify the various types of interaction points described above. Alternately or optionally, voice overs or other informational aids such as pop-ups may be used to convey the existence and purpose of the interaction points to a user.

The interaction points identifier 206 identifies an interaction point by its location within the interactive VR content item in terms of time and position within a given field of view. The metadata generator 208 therefore generates positional metadata 254 for each of the interaction points 252.

The positional metadata 254 of an interaction point uniquely identifies the interaction point in terms of temporal coordinates relative to the time period of play of the length of the interactive VR content item and spatial coordinates of the positional metadata 254 define a specific position for the interaction point within the field of view of the display 132. The metadata generator 208 may also generate action metadata 256 for each of the interaction points 252 based on the respective types. The action metadata 256 of an interaction point may include a code module, executable instructions or a script that is executed by one or more of the user device such as the HMD 130 and the content manager 110 in order to carry out a user-desired action. The action metadata 256 may also include the icons or other UI elements being used to identify the positions of the interaction points 252 within the interactive VR content item to the user. In an example, no additional identifying indicia other than the images from the interactive VR content item itself are used to define the placement of the interaction points. In such cases, the temporal coordinates indicate a time period until which the interaction point associated with the image remains active. The interaction point associated with the image is deactivated upon the expiry of the time period. The interactive VR content loader 210 uploads the interactive VR content item with information regarding the interaction points 252 such as the positional metadata 254 and the action metadata 256 to the content manager 110 for distribution to the various user devices 130, 170.

Figure 3:
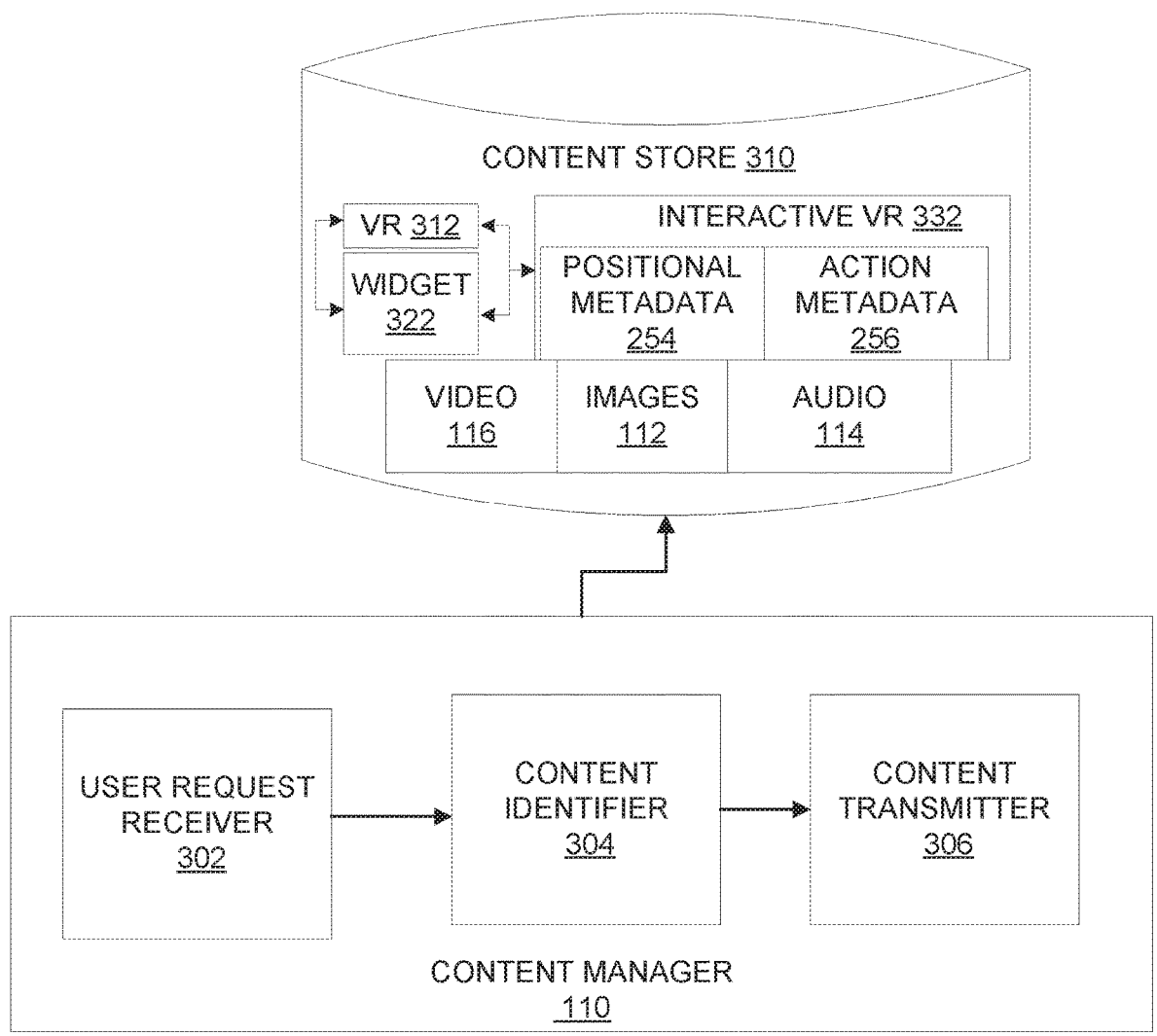
FIG. 3 shows a block diagram of a content manager in accordance with an example.

FIG. 3 shows a block diagram of the content manager 110 in accordance with an example. The content manager 110 includes or is coupled to a content store 310 that stores various types of content such as static images 112, audio 114, video 116, interactive VR content items 118 which includes VR content item 312 from the VR content creation system 150, a widget 322, the positional metadata 254 and the action metadata 256. The content manager 110 is configured to transmit content of various formats based on the requesting device. When a request for content is received by the user request receiver 302, the type of device requesting the content maybe determined for example, by detecting the user agent making the request. Based on the requesting device, the content identifier 304 may identify the correct format of the content item for transmission to the user device by the content transmitter 306. If a web-browser user agent is detected, then web-based content formatted for the user devices 170 can be transmitted. If it is detected that a HMD transmitted the request then the VR content item 312 may be transmitted with the widget 322. The widget 322 may include a script providing access to the interaction points within the VR content item transmitted to the HMD 130. In an example, the widget 322 can be designed or configured to allow the user 160 to toggle between the interactive display mode wherein the interaction points 252 are activated and the passive viewing display mode wherein the interaction points 252 are deactivated of the VR content item 312.

Figure 4:
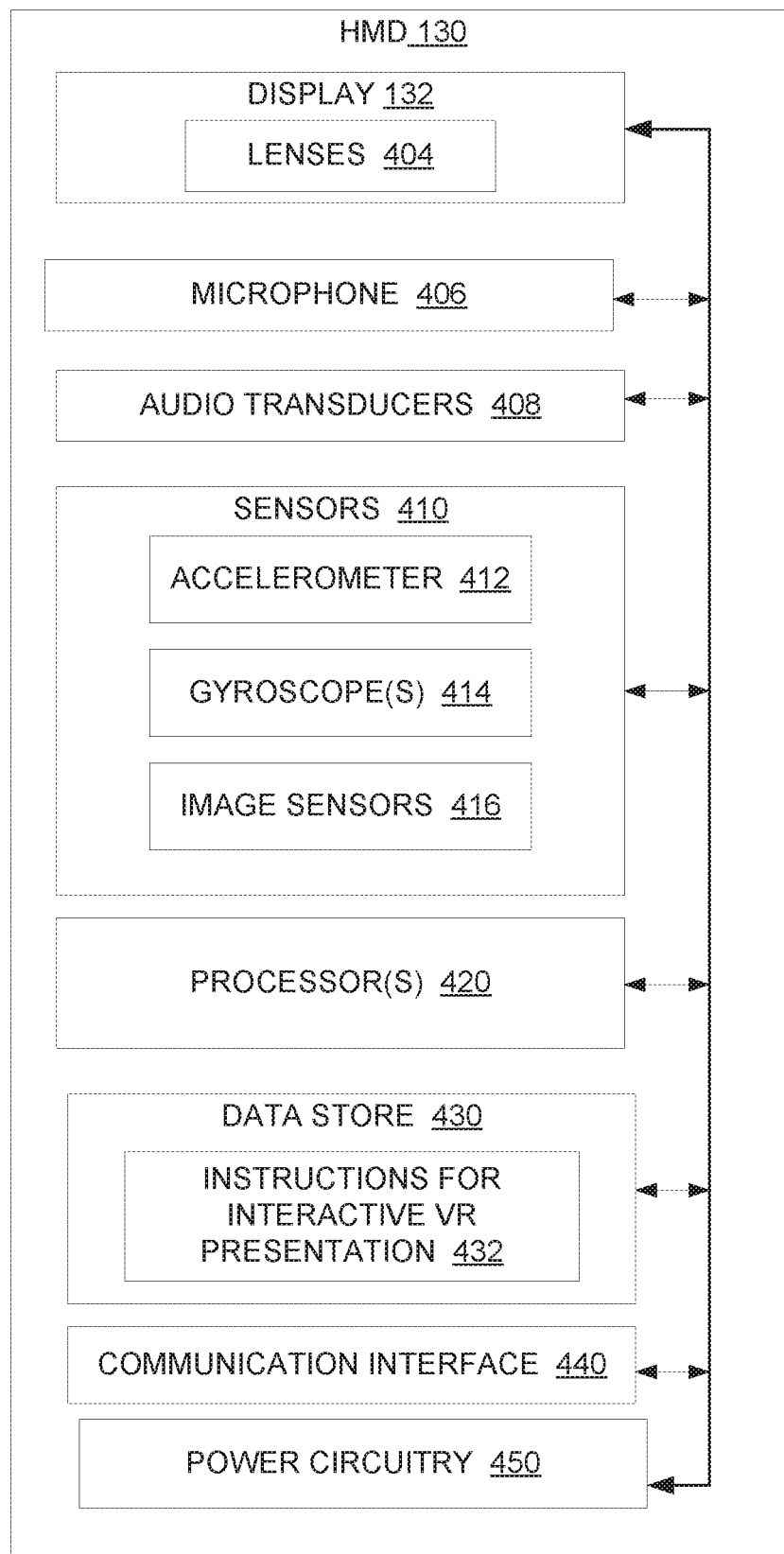
FIG. 4 is a block diagram that shows various parts of an HMD in accordance with an example.

FIG. 4 is a block diagram that shows the various parts of the HMD 130 in accordance with an example. The HMD 130 includes a display 132 made up of lenses 404 to display images to the user 160. The HMD 130 also includes a microphone 406 to receive audio input such as voice commands from the user 160. The HMD 130 is configured with one or more audio transducers 408 such as speakers, earphones, and the like in order to provide auditory output to the user 160 or receive voice input from the user 160. A plurality of sensors 410 of various types such as motion sensors including an accelerometer 412, gyroscope(s) 414 and image sensors 416 are mounted in the HMD 130. The sensors 410 can detect the motion, orientation, and pose of the user's head or neck to execute various functions described herein responsive to user gestures. Image sensors 416 can include inward facing cameras which are able to capture the user's 160 pupil positions or glint changes in order to track the user's 160 gaze across the display 132. It may be understood that sensors shown and described herein are included for illustration purposes only and are not intended to be limiting in any manner. Any other suitable sensors or combination of sensors may be employed to meet the needs of a particular implementation of the HMD 130.

The HMD 130 also includes one or more processors 420 capable of executing instructions stored in a data store 430. The processors 420 are in communication with the sensors 410, display 402, and/or other components through a communications interface 440. The communication interface 440 can also facilitate the HMD 130 being operated in conjunction with remotely located resources, such as processing, storage, power, data, and services such as the content manager 110. In an example, the data store 430 includes instructions 432 that enable the processors 420 to receive and present the interactive VR content items 118 from the content manager 110.

When presenting the interactive VR content items 118, the processors 420 along with the other hardware elements of the HMD 130 enable the user 160 to access the interaction points within the interactive content items 118 and execute functions associated therewith. The HMD 130 also carries power circuitry 450 which includes on-board power sources such as, batteries, protection circuit modules (PCMs) and an associated charger interface and/or remote power interface for supplying power to the HMD 130. It may be appreciated that the HMD 130 is described for the purpose of illustration and is thus not limiting. Other types of HMDs may be employed in accordance with examples described herein to allow users to view and interact with the interactive VR content items 118.

Figure 5:
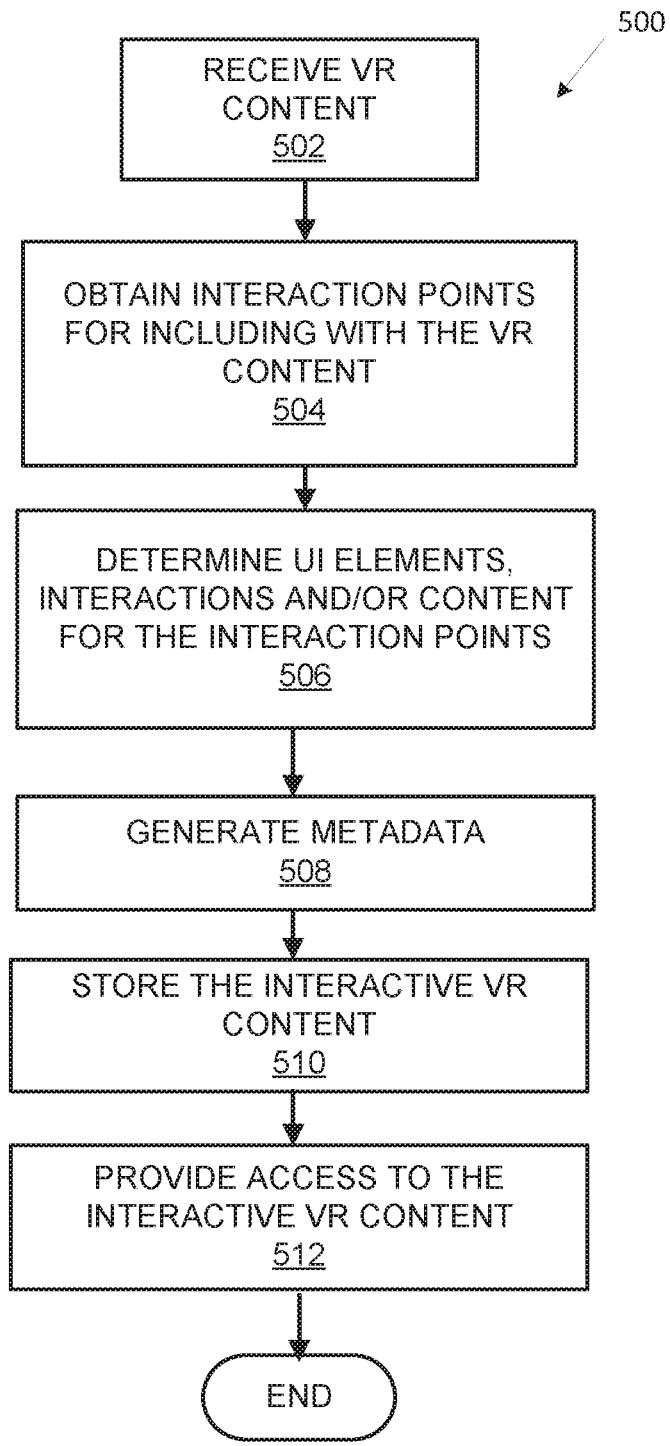
FIG. 5 is a flowchart that details an example of a method for generating interactive VR content executed by the content processor.

FIG. 5 is a flowchart that details an example of a method of generating interactive VR content executed by the content processor 140. The method to generate interactive VR content items begins at 502 with receiving a VR content item 312 created by the VR content creation system 150. In an example, the VR content item 312 provided by the VR content creation system 150 may include panoramic images/videos of real-world environment. In another example, the VR content item 312 supplied to the content processor 140 may be artificially generated via computer graphics. The VR content item 312 used for the generation of an interactive VR content item may also be received from sources external to the VR content creation system 150. In any case, the VR content item 312 from the VR content creation system 150 or other source when viewed through the HMD 130 provides an immersive VR experience to the user 160 wherein the display may shift with the user's 160 head movements. However, without further processing, the VR content item 312 provides only passive viewing experience and is not configured for additional user interactions described herein.

At 504, the interaction points that are to be included with the VR content item 312 are obtained. As mentioned herein, the interaction points 252 in the interactive VR content items 118 are based on the category 122 of the VR content item 312 and the category info 124 of the VR content item 312. Based on the categorization of the VR content item 312, a core set of the interaction points for the VR content item 312 may be selected. For example, if the VR content item 312 pertains to ecommerce category, the core set of interaction points includes interaction points for displaying product description, price information, checking out the product and paying for the product. In another example, if the VR content item 312 is categorized as a movie or a travel documentary, the core set of interaction points may include the interaction points for manipulating the play of the movie such as for play, pause, rewind or fast-forward. Similarly, each category 122 may have a respective core set of interaction points associated therewith. In addition, a human user can review the VR content item 312 and identify interaction points to be added thereon. Thus, the core set of interaction points and those identified by the human user are obtained at 504. It can be appreciated that the core set of interaction points may include non-transient interaction points that are displayed throughout the play of the interactive VR content item 332 and transient interaction points that are displayed at specific time periods during the play of the interactive VR content item 332.

At 506, the UI elements, interactions and content to be associated with each of the interaction points 252 is determined. In one example, the VR content item 312 may be identified with a content category 122 and a set of UI elements, interactions and content may be associated with the content category 122. In the ecommerce example, the UI elements may be selectable icons that enable user interactions such as but not limited to, selecting a product, browsing for further information regarding the product, adding the product to a cart and purchasing the product. The interactions may include processor-executable code or instructions that map particular user gestures to specific actions to be executed by a processor executing the interactive VR content items 118, such as a processor which may be included in the HMD 130. For example, if the user's 160 head remains steady without motion for a predetermined time period, it may indicate a selection of an object shown at the center of the display. The information regarding the position of the user's head can be obtained from the data emitted by the sensors 410 within the HMD 130. Similarly, specific voice commands may be mapped to particular interactions to be executed. Combinations of head gestures and voice commands may also be mapped to particular interactions. The content associated with the interactions points can include product description, price, discounts, related product information and the like. The content for associating with the interaction points may be obtained from the data system 120.

At 508, the positional metadata 254 and the action metadata 256 is generated. The positional metadata 254 can include the ranges for x, y and z coordinates of the sensors 410 of the HMD at which the interaction points are positioned. The sensor coordinates may indicate the position of the user's 160 head relative to a product display within the HMD 130. As VR content is dynamically altering imagery, the positional metadata for specific interaction points that need to appear only when certain elements of the interactive VR content item 332 are being viewed can be further defined in terms of temporal coordinates or VR content frames. When that particular portion of the interactive VR content item 332 is being viewed, the UI elements associated with the interaction points that correspond to that portion of the interactive VR content item 332 will be displayed. The temporal coordinates may also be defined in terms of time periods during which the UI elements of the interaction points are displayed. The time periods may be included as sets of beginning and ending time points when the interaction points are activated. Upon the expiry of the time periods, the UI elements may be automatically hidden and/or the interaction points are deactivated.

The action metadata 256 may include information regarding the actions that need to be executed by the processors 420 of the HMD 130 when the interaction points are selected. The actions may be associated with displaying content items which pop up when the user's head position coincides with the position metadata for the particular content. The action related metadata may also include GUI (Graphical User Interface) metadata which may include identification of UI elements such as button, icons or other controls that need to automatically appear when the user's 160 head position coincides with the corresponding positional metadata of the UI element.

The interactive VR content item 332 including the corresponding positional metadata 254 and action metadata 256, the VR content item 312 with the widget 322 thus generated is stored to the content manager 110 at 510. In an example, the interactive VR content item 332 may include audiovisual cues that help the user 160 with navigating in the VR environment and executing desired actions. At 512, access to the interactive VR content items 118 can be provided via an application or other tool executable by the processor(s) within the HMD 130.

Figure 6:
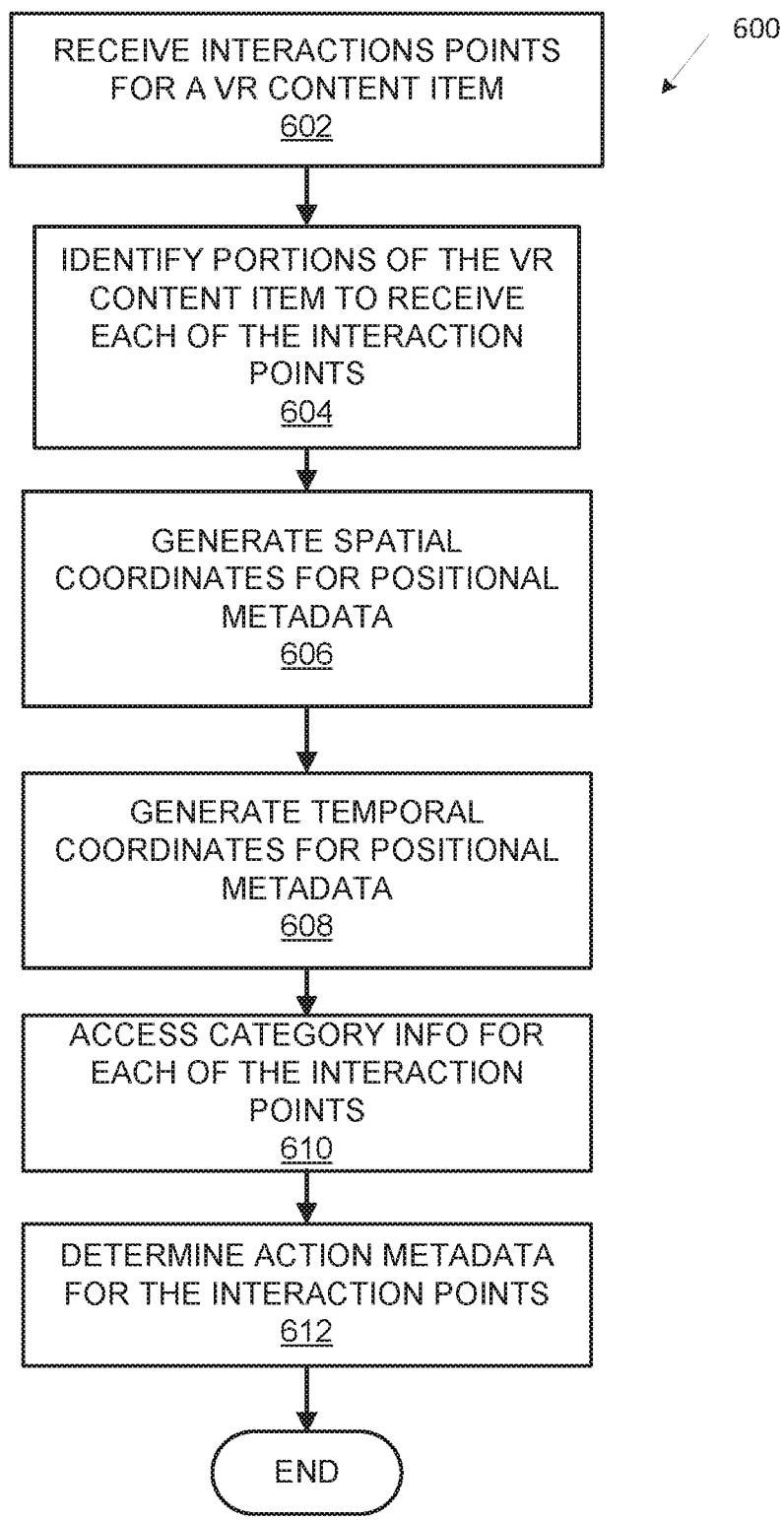
FIG. 6 is a flowchart that details a method of generating metadata for interaction points in accordance with an example.

FIG. 6 is a flowchart that details a method of generating the metadata for the interaction points in accordance with an example. The set of interaction points to be included with the VR content item 312 are accessed at 602. The interaction points can include a set of core interaction points which are selected based on the categorization of the VR content item 312 and may optionally include additional interaction points identified by a human user. At 604, the portions of the VR content item 312 for receiving or embedding the interaction points are identified. For the core set of interaction points, their position and action metadata may be predefined and can be automatically identified at 604. Generally, the display portions of the VR content item 312 which do not obstruct the user's 160 view of an object of interest may be selected for receiving the core set of interaction points2. An interaction point may be a location within the VR content item which enables user interaction with the interactive VR content item 332. An interaction point may be indicated to the user 160 via one or more of overlaying icons or other visible indicia such as tool tip text, changing the shape of a pointer icon and voice feedback. In an example, the portions of the VR content item 312 for overlaying the icons for the interaction points 252 may be automatically identified via image processing. Image processing algorithms may use AI techniques such as trained classifiers to identify portions of the VR content item 312 suitable for receiving the icons, for example, icons or other input associated with the core set of interaction points. In an example, a human user who may be reviewing the finalized interactive VR content items 118 prior to uploading to the content manager 110 may be able to manually adjust the positions of the interaction points 252 if required. Turning to the ecommerce example, a portion of the VR content item 312 which does not occlude or otherwise obstruct the user's 160 view of a product image and yet is proximate enough to be associated with the product image may be selected for placement of icon(s) that enable the user to select or purchase or otherwise interact with the product. Accordingly, positional metadata in the form of spatial coordinates corresponding to the location of the interaction points within the field of view of the display 132 are generated at 606.

There may be a subset of transient interaction points that are required only at certain time period during the play of the interactive VR content item 332 whereas certain non-transient interaction points may need to be accessible throughout the play of the interactive VR content item 332. For example, non-transient interaction points for the manipulation of the shopping cart may be accessible to the user 160 throughout the play of an ecommerce-based interactive VR content item. On the other hand, a transient interaction point showing the product description of a single sale item among multiple sale items being featured in the interactive VR content item 332 will need to be displayed only during the time period when the single sale item is being shown to the user 160. The UI elements for the non-transient interaction points may be constantly displayed throughout the play of the interactive VR content item 332 at positions that are generally fixed relative to the display 132. The positions of the non-transient interaction points may also be invariant with respect to time of play of the interactive VR content item 332. At 608, the temporal coordinates of the positional metadata for the interaction points that appear for certain time periods (or at certain positions along the timeline of VR content play) are set, for example, to a beginning time point and an ending time point of the time period. Thus, the interaction points that are to appear constantly throughout the VR content play can have their temporal coordinates set as the total time period of play of the interactive VR content item 332.

At 610, the category info 124 is accessed for each of the interaction points for example via one or more of the input UIs 220 or via the configuration files which can be stored in the data system 120. At 612, a combination of the positional metadata 254 and the category info 124 may be used to determine the action metadata 256 for each of the interaction points 252. For example, predetermined positional metadata set for an interaction point for the manipulation of a shopping cart in an interactive ecommerce VR content item may be accessed and an interaction point whose positional metadata coincides with the predetermined positional metadata may have its action metadata set based on the actions associated with the shopping cart manipulation. The user interface elements which signal the presence of the interaction point to the user can also be similarly set under the action metadata 256.

Figure 7:
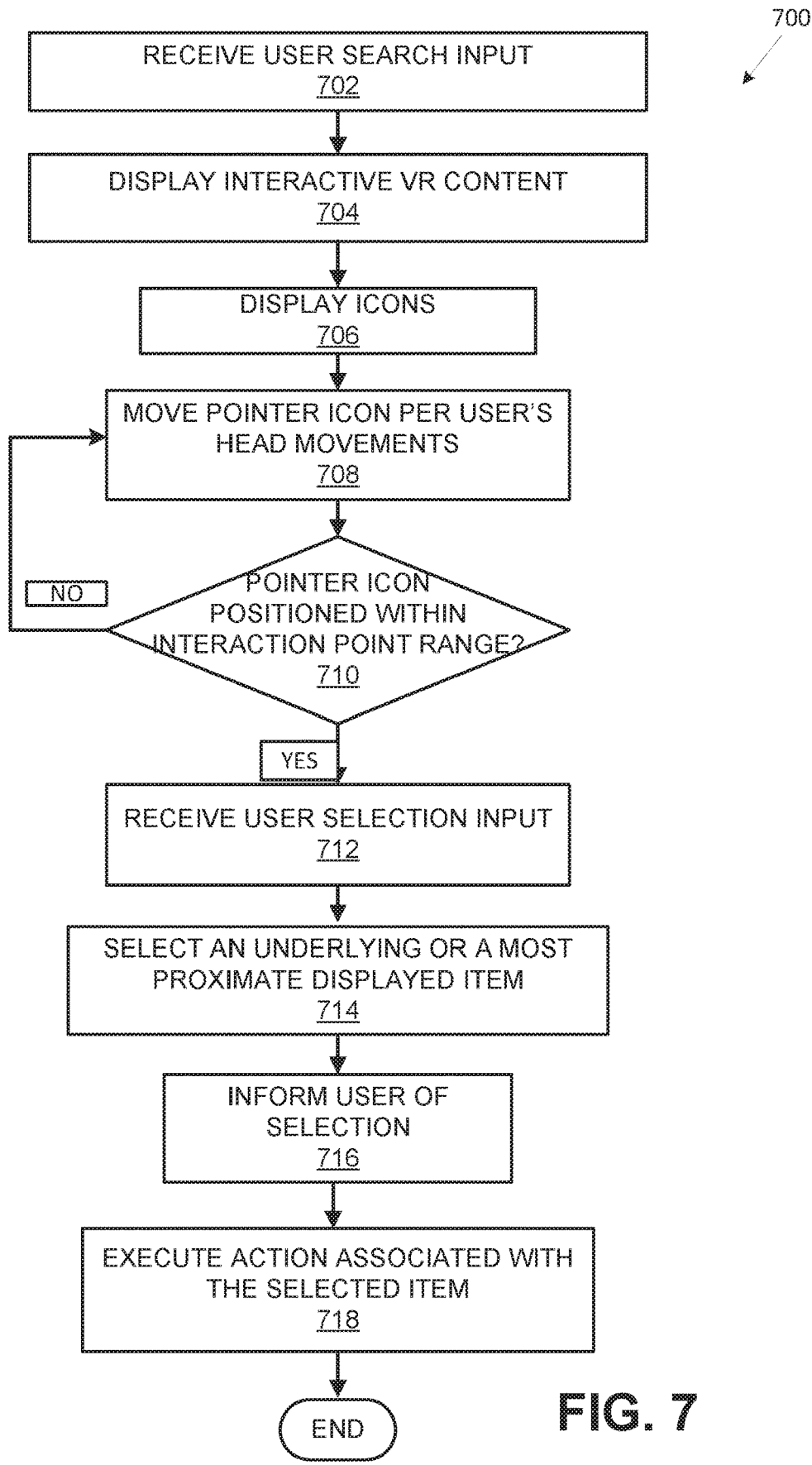
FIG. 7 is a flowchart that details a method of providing interactive VR content in accordance with an example.

FIG. 7 is a flowchart 700 that details a method of providing interactive VR content. The method 700 may be executed by a VR 'app' or other user interface widget executing on the HMD 130. The method 700 begins with the user 160 accessing the app to issue a search query or other input to initiate the interaction process at 702. In an example, the interaction process may be initiated via a user gesture such as a head motion or via the user issuing an audio search query. At 704, at least one interactive VR content item 332 responsive to the user input are displayed. Alternately, a user may be viewing the VR content item 312 in a passive viewing mode. The VR content item 312 may include a widget or other UI element and/or be configured to respond to the user's verbal command to display the VR content item in an interactive mode. Upon receiving the user's input, the interactive VR content item 332 may be displayed.

At 706 various icons that facilitate user interaction with the interactive VR content item 332 are displayed. In one example, a pointer icon may be displayed and selected by default in order to enable the user 160 to make selections to interact with the interactive VR content item 332. The pointer icon is moved in accordance with the user's head movements at 708. Information regarding the movements of the user's 160 head are received from the sensors of the HMD 130 and the pointer icon may be configured to move on a display screen of the HMD 130 in accordance with the information emitted by the sensors.

At 710 it is determined if the pointer icon is within a selection range of an interaction point. As discussed herein, the interactive VR content items 118 are configured not only with the VR images/videos but are also configured with interaction points within the VR images/videos. The interaction points may have specific selection ranges based, for example on their positional metadata, for the pointer icon. The respective selection ranges of each of the interaction points for the pointer icon can alternately or additionally be mapped to respective specific predetermined ranges of the sensor data for the user's head. The predetermined ranges of the sensor data for the user's head may include a range of values for the position of the user's head on each of the X, Y and Z axes (known as pitch, yaw and roll respectively) as shown in FIG. 1.

When the sensor data indicates that the user's 160 head lies within the predetermined range, the interactive VR app determines at 710 that the pointer is within a selection range of one of the interaction points. Accordingly, the interaction point may be selected. Thus, the user 160 is able to execute actions via the head movements without the need for further input mechanisms. If it is determined at 710 that the user's 160 head is not within the sensor data range or that the pointer icon is not within the selection range of any interaction points, the method returns to 708 to continue tracking the user's 160 head movements. In an example, the selection may be configured as a two-step process so that the pointer is within the selection range of the interaction point and stays within the selection range for a predetermined time period in order to confirm that the user 160 intends to make the selection and is not merely navigating past the interaction point. Based on the user's selection, an icon or product in the display underlying the pointer icon or in closest proximity to the pointer icon is selected at 714. At 716, the user 160 may be informed of the selection, via visual cues such as pop-ups or by changing the color of the selected icon or via a voice-over. At 718 an action associated with the selected item may be executed. For example, purchase of an item or providing additional content may be respectively executed if one of a shopping cart icon or an information icon is selected. If a displayed product for sale is selected, the HMD 130 may await a further user selection of an icon to determine what action the user 160 wishes to execute with the selected products.

Figure 8:
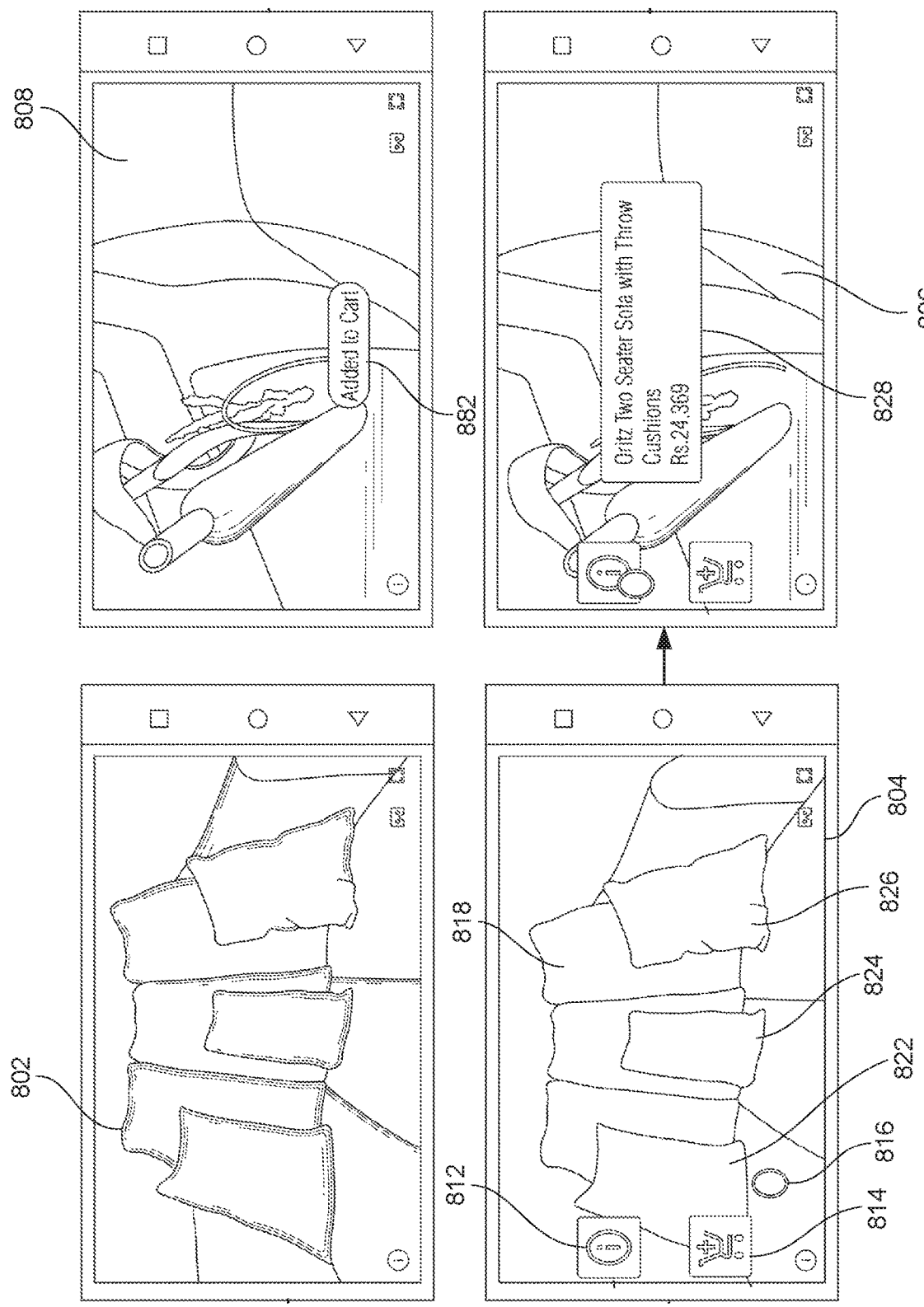
FIG. 8 illustrates some displays of an interactive VR content item related to an ecommerce application in accordance with an example.

FIG. 8 illustrates some example displays of an interactive VR content item related to an ecommerce application. The ecommerce application presents interactive VR content items that provide images/videos and information regarding various products in addition to allowing purchase of the products via icons or other UI elements included in the interactive VR content displays. The interactive VR content display 802 shows an image of a sofa set being viewed by the user 160 via the HMD 130. The initial VR content for the ecommerce application may be generated by the VR content creation system 150 by capturing images of the sofa set in a retail outlet or at another real-world location using the 360 degree cameras 152 and/or 154 and video processing tools 156.

The display 804 shows three icons 812, 814 and 816 which enable the user 160 to interact with the VR content. The pointer icon 816 is a default icon that functions as a pointer and may track the user's 160 head movements. When the user's 160 head is held steady for a predetermined time period, such as a few seconds for example, the pointer icon 816 may select an underlying selectable item or a closest selectable item if there is no selectable item below it. The selectable items may include not only the icons 812 and 814 but also one or more of the displayed products. For example, the pointer icon 816 may be used to select and/or deselect the sofa 818 or any of the products 822, 824 or 826 placed thereon. In an example, background voice prompts or visual cues may be used to direct the user 160 through the navigation and selection process.

In case the user 160 wants further information regarding any of the products 818, 822, 824 or 826, the user 160 may move the icon 816 further up the display 804 to select the information icon 812 as shown in the display 806. In an example, the color of the selected information icon 812 may be changed in the display 806 to inform the user 160 of the selection. In response to the selection of the information icon 812, information such as the price of the products 818, 822, 824 and 826 is displayed at 806 in an overlay 828. The overlay 828 may include other information such as descriptions or links to other websites or VR content items that may aid the user 160 in making a purchasing decision.

On making a decision to purchase the products 818, 822, 824 and 826, the user 160 moves the pointer icon 816 further down from the information icon 814 via head movement to select the shopping cart icon 814 as shown at 808. When the shopping cart icon 814 is selected, the products 818, 822, 824 and 826 are added to the shopping cart shown in the display 808. A visual cue 882 regarding the addition of the products 818, 822, 824 and 826 to the shopping cart is also shown to the user 160. Subsequent displays which take the user 160 through screens for payment gateways, shipping information and the like may be similar to those currently used in ecommerce websites or may include payment modes which are to be invented. However, user navigation through the subsequent screens may be configured in accordance with examples described herein such as, via the user's 160 head tracking and/or voice commands. The user 160 is therefore able to interact with the VR content items shown by the content providing device 180 to execute various functions within the immersive VR environment.

It can be appreciated that the displays from an ecommerce application are shown and described only by the way of illustration and that similar interactions may be implemented in other applications such as information applications, entertainment applications, gaming applications and the like. In an example, the interactive VR content items may be initially displayed in a passive mode wherein the user 160 is able to navigate through the VR content items without having the display interrupted with the icons or other interaction widgets. This may be similar to the real-world window shopping experience. When the user 160 desires to take a closer look at a product, for example, via requesting further information or desires to make a purchase, the interactive mode may be switched on via one or more of an audio command or a head motion gesture. In this case the VR content from the VR content creation system 150 is initially displayed to the user and when the user desires to interact with any of the displayed content, the corresponding interactive VR content item may be displayed in the interactive mode.

Figure 9:
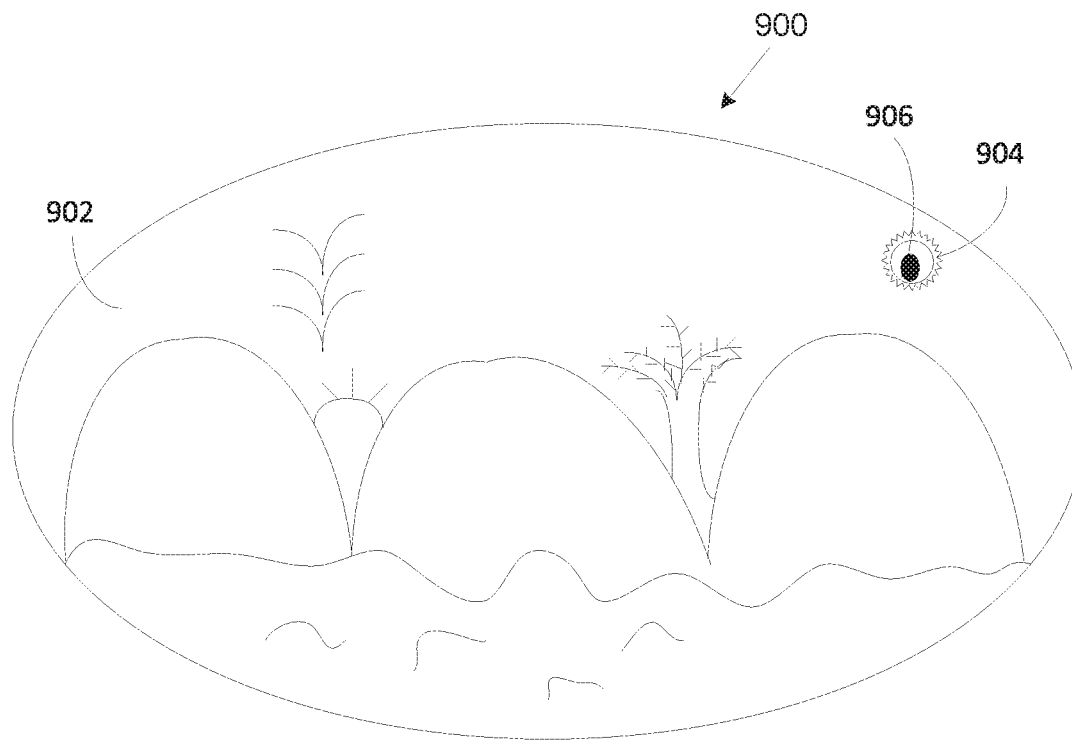
FIG. 9 illustrates switching of display modes of a VR content item from a passive viewing mode to an interactive mode in accordance with an example.
Figure 9:
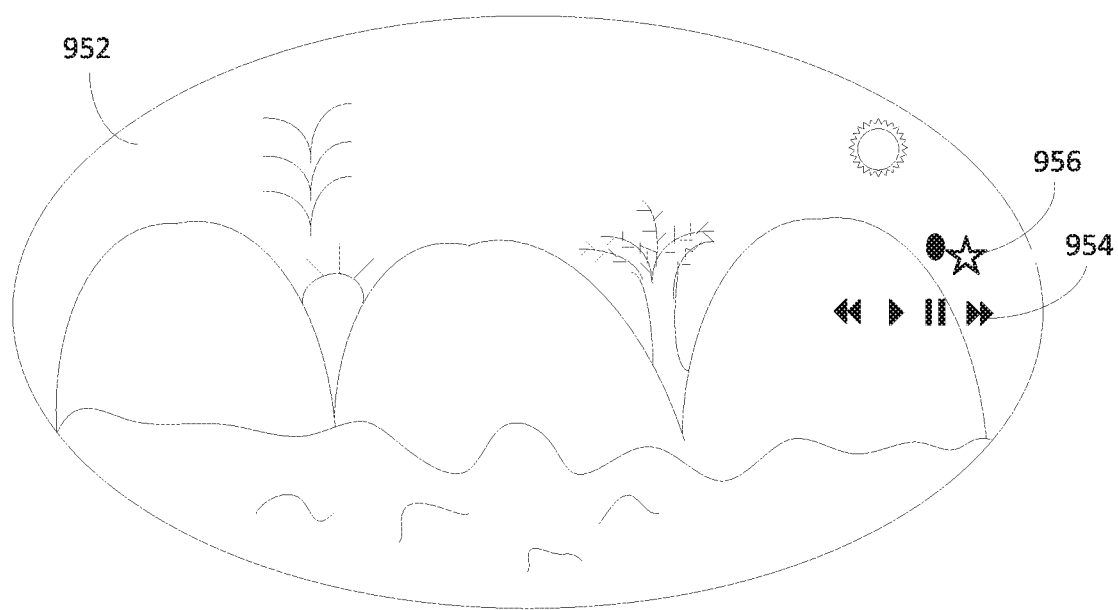

FIG. 9 illustrates the switching of the display modes of a VR content item 900 from a passive viewing mode to an interactive mode. In the initial display 902, the VR content item 900 is being displayed in a passive viewing mode wherein no interaction points are displayed. However, a widget 904 is provided which the user 160 can select with either moving the pointer icon 906 via moving her head or via a voice command. Upon the selection of the widget 904, the VR content item 900 is displayed in an interactive mode as shown at 952 wherein an interaction point 956 which was embedded in a current view is displayed via a star-shaped UI element. When the pointer icon 906 is moved proximate to the interaction point 956, it is selected and an action associated with the interaction point 956 is executed. It may be noted that the pointer icon 906 needed not coincide or obscure the interaction point 956 completely as in the display at 902. However, a certain proximity is required between the interaction point 956 and the pointer icon 906 in order to signal the HMD 130 the user's 160 intention to select the interaction point 956. The selection of the interaction point 956 causes an action of displaying playback controls 954 in a transparent overlay on the background of the view 952. As the pointer icon 906 navigates away from the interaction point 956, the playback controls 954 may fade from the view 952 thereby providing the user 160 an uninterrupted view of the VR content item 900. Navigating the pointer icon 906 back within the proximity of the interaction point 956 may cause the playback controls 954 to re-appear. In an example, the VR content item 900 may be associated with entertainment category and the interaction point 956 that provides access to the playback controls 954 may be one of the core set of interaction points associated with the entertainment category. In an example, the widget 904 may not be included in the display 902 and instead, the view 952 may be accessible via a voice command from the user 160.

Figure 10:
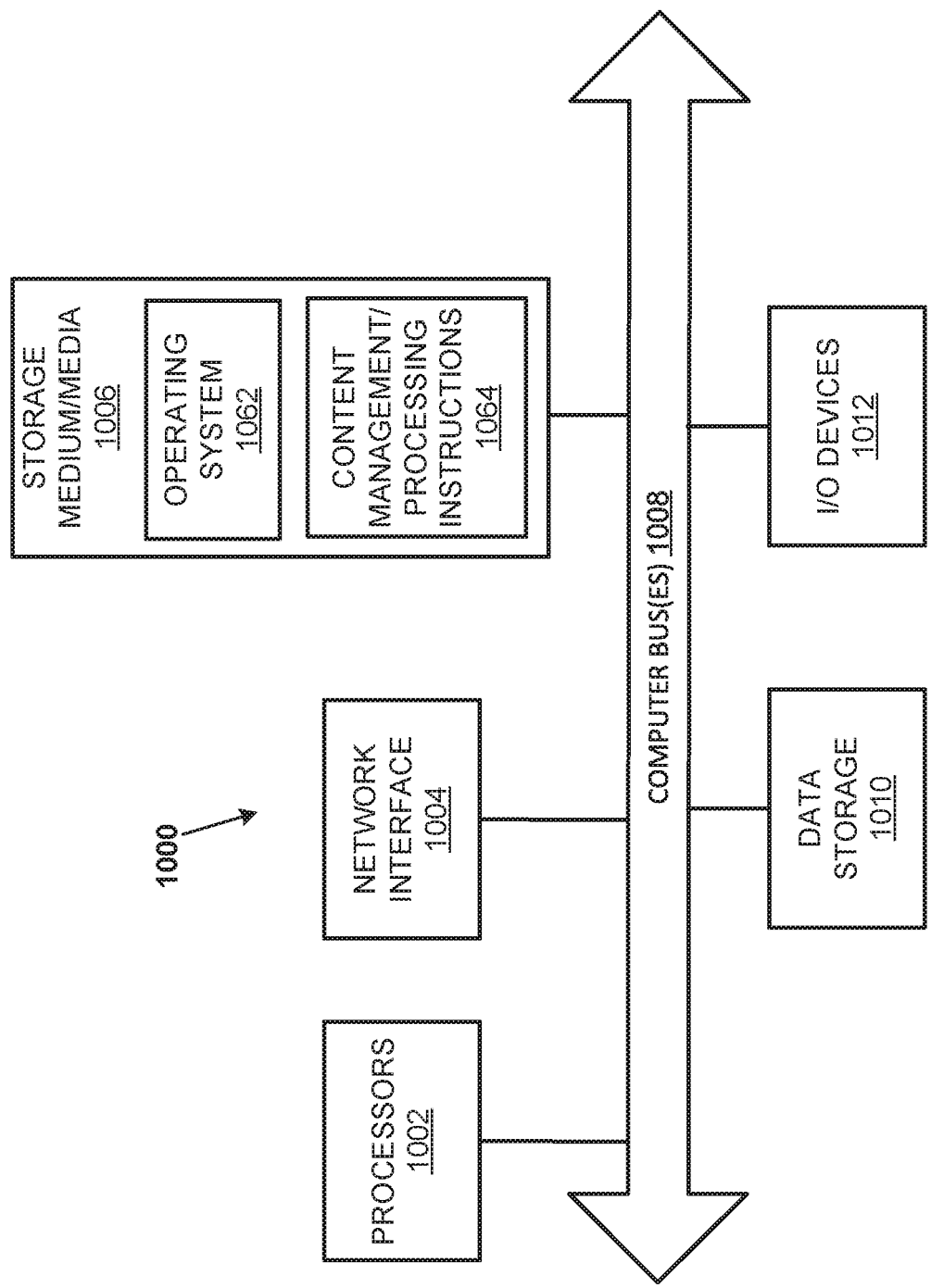
FIG. 10 illustrates a computer system that may be used to implement one or more of a content management system or the content processor, according to an example.

FIG. 10 illustrates a computer system 1000 that may be used to implement one or more of the content manager 110 or the content processor 140. More particularly, computing machines such as desktops, laptops, smartphones, tablets, wearables which may be used to generate, process, host and transmit interactive VR content may have the structure of the computer system 1000. The computer system 1000 may include additional components not shown and that some of the components described may be removed and/or modified.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 502.11x LAN, a 3G or 4G mobile WAN or a WiMax WAN, and a computer-readable medium 1006. Each of these components may be operatively coupled to a bus 1008. The computer-readable medium 1006 may be any suitable medium which participates in providing instructions to the processor(s) 1002 for execution. For example, the computer-readable medium 1006 may be non-transitory or non-volatile medium, such as a magnetic disk or solid-state non-volatile memory or volatile medium such as RAM. The instructions or modules stored on the computer-readable medium 1006 may include computer-readable or machine-readable instructions 1064 executed by the processor(s) 1002 to perform the methods and functions for interactive VR content processing and management. The computer-readable medium 1006 may also store an operating system 1062, such as MAC OS, MS WINDOWS, UNIX, or LINUX. The operating system 1062 may be multi-user, multiprocessing, multitasking, multithreading, real-time and the like. For example, during runtime, the operating system 1062 is running and the instructions 1064 are executed by the processor(s) 1002.

The computer system 1000 may include a data storage 1010, which may include non-volatile, non-transitory data storage. The data storage 1010 stores any data used by the VR content processing and management systems. The data storage 1010 may be used to store real-time data from the VR content creation system 150, intermediate data generated during the processing of the VR content from the VR content creation system 150 and the finalized interactive VR content items 118 along with other audio, video content stored and supplied by the content manager 110.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. An interactive VR content providing system comprising:
    at least one processor; and
    a non-transitory data storage storing machine readable instructions that cause the at least one processor to:
    receive a virtual reality (VR) content item;
    identify a category of content imaged within the VR content item;
    identify a plurality of interaction points to be included with the VR content item, wherein the plurality of interaction points enable user interaction with the VR content item and identifying the plurality of interaction points includes:
        determining at least one core interaction point that is included automatically with the VR content item based at least on the category of content imaged within the VR content item; and
        receiving indications from a content processing user for one or more additional interaction points to be included within the plurality of interaction points;
    identify positions within the VR content item for including the plurality of interaction points;
    generate positional and action metadata for the plurality of interaction points, the positional metadata defining placements for the plurality of interaction points within the VR content item in terms of locations and times and the action metadata defining actions to be executed when the plurality of interaction points are selected by a user;
    store an interactive VR content item, the interactive VR content item comprising at least the VR content item, the positional and action metadata;
    receive a user request for accessing content; and
    transmit the VR content item that enables switching a display mode of a given view between a passive viewing display mode where the plurality of interaction points are deactivated and invisible and an interactive display mode that causes a display of a plurality of UI elements within the given view upon user command, wherein the plurality of UI elements provide access to the plurality of interaction points included at points within the VR content item designated by the positional metadata.

2. The interactive VR content providing system of claim 1, wherein instructions to generate positional and action metadata for the plurality of interaction points further comprise instructions that cause the at least one processor to:
    retrieve positional and action metadata associated with the at least one core interaction point; and
    receive positional and action metadata associated with each of the additional interaction points from the content processing user.

3. The interactive VR content providing system of claim 1, wherein a category of the VR content item is an ecommerce content item and the instructions to generate the positional and action metadata further comprise instructions that cause the at least one processor to:
    generate the positional metadata for the plurality of interaction points wherein the plurality of interaction points comprise an informational interaction point and a purchase interaction point, the positional metadata for the informational interaction point comprising position coordinates such that the informational interaction point is overlaid on an item for sale and position coordinates for the purchase interaction point such that the purchase interaction point is displayed on a corner of a display showing the item for sale to the user.

4. The interactive VR content providing system of claim 3, wherein the instructions to generate the positional and action metadata further comprise instructions that cause the at least one processor to:
    generate the action metadata for the informational interaction point, the action metadata comprising information regarding the item for sale to be displayed when the information interaction point is selected; and
    generate the action metadata for the purchase interaction point, the action metadata of the purchase interaction point comprising executable instructions such that selection of the purchase interaction point adds the item for sale to a virtual shopping cart.

5. The interactive VR content providing system of claim 1, wherein the instructions to transmit the VR content item further comprise instructions that cause the at least one processor to:
    configure the interactive display mode to be activated via one or more of a user gesture and a voice input from the user.

6. A method of providing interactive VR content comprising:
    identifying a category of content imaged within a VR content item;
    determining a plurality of interaction points to be included with the VR content item, wherein the plurality of interaction points enable user interactions with the VR content item and the plurality of interaction points include at least one core interaction point that is included automatically with the VR content item based at least on the category of content imaged within the VR content item;
    receiving indications from a content processing user for one or more additional interaction points to be included within the plurality of interaction points;
    identifying positions within the VR content item for including the plurality of interaction points that enable user interaction with the VR content item;
    generating positional and action metadata for the plurality of interaction points, the positional metadata defining placements for the plurality of interaction points within the VR content item in terms of locations and times and the action metadata defining actions to be executed when the plurality of interaction points are selected by a user;

enabling display of the VR content item with a widget providing access to an interactive VR content item corresponding to the VR content item and at least a pointer icon, the interactive VR content item comprising the VR content item with the plurality of interaction points defined by respective positional metadata and action metadata;

enabling switching a display mode upon receiving input from a user selecting the widget, wherein the display mode of a given view is switched from a passive viewing display mode where the plurality of interaction points are deactivated and invisible to an interactive display mode that causes a display of a plurality of user interface (UI) elements corresponding to the plurality of interaction points in the given view wherein the plurality of interaction points provide access to the interactive VR content item in response to the selection of the widget;

causing display of the interactive VR content item in the interactive display mode with the plurality of UI elements overlaid at positions specified by the positional metadata corresponding to the plurality of interaction points; and causing execution of an action associated with a selected interaction point defined by the action metadata of the interaction point upon selection of at least one of the UI elements, wherein causing the execution of the action includes:
  tracking movement of a user's head as the user is viewing the interactive VR content item;
  moving the pointer icon to track the user's head movements;
  determining that the pointer icon lies within a selection range of the interaction point; and
  selecting the at least one UI element associated with the interaction point.

7. The method of claim 6, wherein receiving input from a user selecting the widget further comprises:
  receiving a gesture from the user selecting the widget for switching the display mode.

8. The method of claim 6, wherein receiving input from a user selecting the widget further comprises:
  receiving a voice input from the user selecting the widget for switching the display mode of the given view from the passive viewing display mode.

9. The method of claim 6, wherein tracking movement of a user's head further comprises:
  accessing data emitted by one or more sensors of a HMD device employed by the user to view the interactive VR content item.

10. The method of claim 9, wherein determining that the pointer icon lies within a selection range of the interaction point further comprises:
  comparing the accessed data to a predetermined range; and
  determining that the pointer icon lies within the selection range of the interaction point if the accessed data lies within the predetermined range.

11. The method of claim 6, wherein further comprising:
  changing a color of the UI element to indicate the selection of the UI element by the user.

12. The method of claim 6, wherein displaying the interactive VR content item and at least a pointer icon further comprises:
displaying the interactive VR content item with at least an informational interaction point and a purchase interaction point, wherein the interactive VR content item displays an item for sale.

13. The method of claim 12, wherein selecting a UI element associated with the interaction point further comprises:
  selecting the UI element associated with the informational interaction point; and
  displaying additional information regarding the item for sale in response to the selection of the informational interaction point.

14. The method of claim 12, wherein selecting the UI element associated with the interaction point further comprises:
  selecting the UI element associated with the purchase interaction point; and
  adding the item for sale to a virtual shopping cart in response to the selection of the purchase interaction point.

15. The method of claim 6, wherein switching a display mode to display the interactive VR content item in response to the selection of the widget further comprises:
  switching via a voice command from the user, a display of the plurality of UI elements that provide access to the plurality of interaction points within the given view based on switching of the display mode between the passive viewing mode and the interactive display mode.

16. A non-transitory computer-readable storage medium comprised in a user device, the computer-readable storage medium comprising machine-readable instructions that cause a processor to:
  receive a virtual reality (VR) content item;
  identify a category of content imaged within the VR content item;
  identify a plurality of interaction points to be included with the VR content item, wherein the plurality of interaction points enable user interaction with the VR content item and identifying the plurality of interaction points includes:
    determining at least one core interaction point that is included automatically with the VR content item based at least on the category of content imaged within the VR content item; and
    receiving indications from a content processing user for one or more additional interaction points to be included within the plurality of interaction points;
  identify positions within the VR content item for including the plurality of interaction points;
  generate positional and action metadata for the plurality of interaction points, the positional metadata defining placements for the plurality of interaction points within the VR content item in terms of locations and times and the action metadata defining one or more actions to be executed when at least one of the plurality of interaction points are selected by a user and corresponding user interface elements to be associated for displaying the interaction point to the user;
  store interactive VR content item, the interactive VR content item comprising at least the VR content item, the positional and action metadata;
  receive a user request for accessing content; and
  transmit the VR content item that enables toggling a display mode of a given view between a passive viewing display mode where the plurality of interaction points are deactivated and invisible and an interactive display mode that causes a display of a plurality of user interface (UI) elements within the given view, wherein the plurality of UI elements provide access to the plurality of interaction points displayed at points within the VR content item designated by the positional metadata upon the user activating the widget.

17. The non-transitory computer-readable storage medium of claim 16, the instructions to generate positional and action metadata for the plurality of interaction points, further comprising instructions that cause the processor to:
generate the positional metadata to comprise temporal coordinates for activating one or more of the plurality of interaction points within the interactive VR content item; and
generate the action metadata to comprise machine-executable instructions for carrying out the actions when the interaction point is selected.

18. The non-transitory computer-readable storage medium of claim 17, the instructions to generate the positional metadata to comprise the temporal coordinates, further comprising instructions that cause the processor to:
generate the temporal coordinates for a transient interaction point of the plurality of interaction points, the transient interaction point appears for a time period during a play of the interactive VR content item and the temporal coordinates for at least one UI element of the plurality of UI elements corresponding to the transient interaction point are set to a beginning time point and an ending time point of the time period.

19. The non-transitory computer-readable storage medium of claim 17, the instructions to generate the positional metadata to comprise the temporal coordinates, further comprising instructions that cause the processor to:
generate the temporal coordinates for a non-transient interaction point of the plurality of interaction points, the non-transient interaction point appears throughout a play of the interactive VR content item and the temporal coordinates for at least one UI element of the plurality of UI elements corresponding to the non-transient interaction point are set to a total time period of the play of the interactive VR content item.

* * * * *